Nov. 22, 1960  H. B. BAUGHMAN  2,961,601
MEAN FREE PATH VACUUM GAGE
Filed Dec. 27, 1957  3 Sheets-Sheet 1
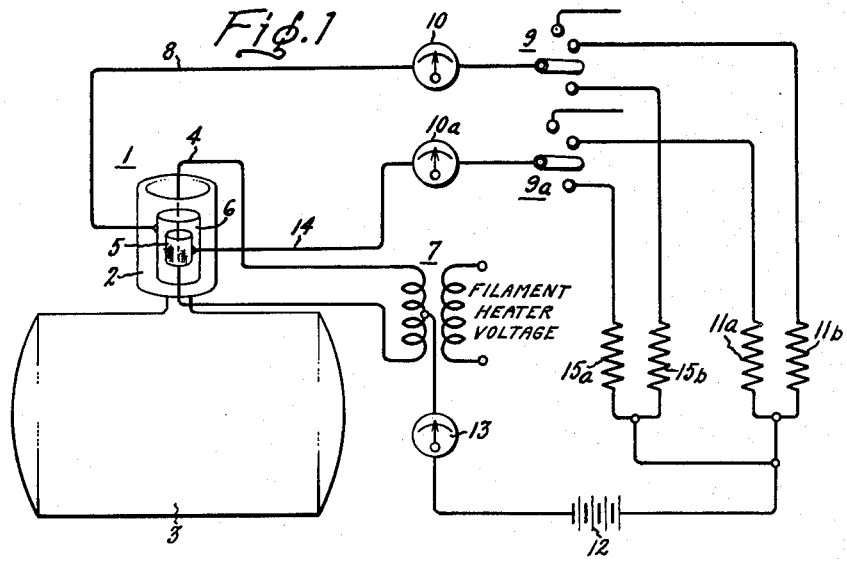
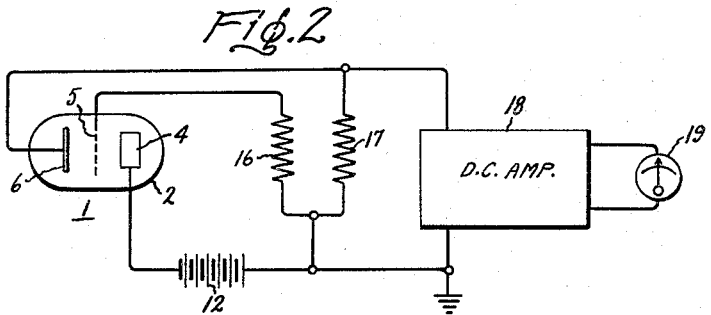
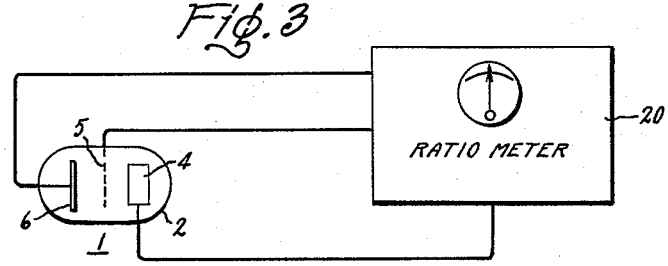
Inventor:
Howard B. Baughman,
by *(signature)*
His Attorney.

Nov. 22, 1960 H. B. BAUGHMAN 2,961,601
MEAN FREE PATH VACUUM GAGE
Filed Dec. 27, 1957 3 Sheets-Sheet 2
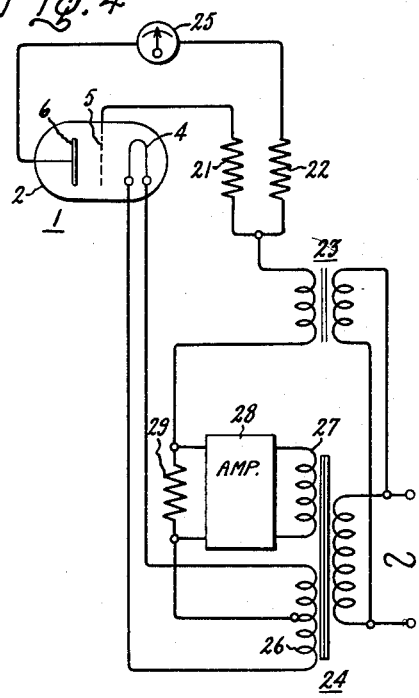
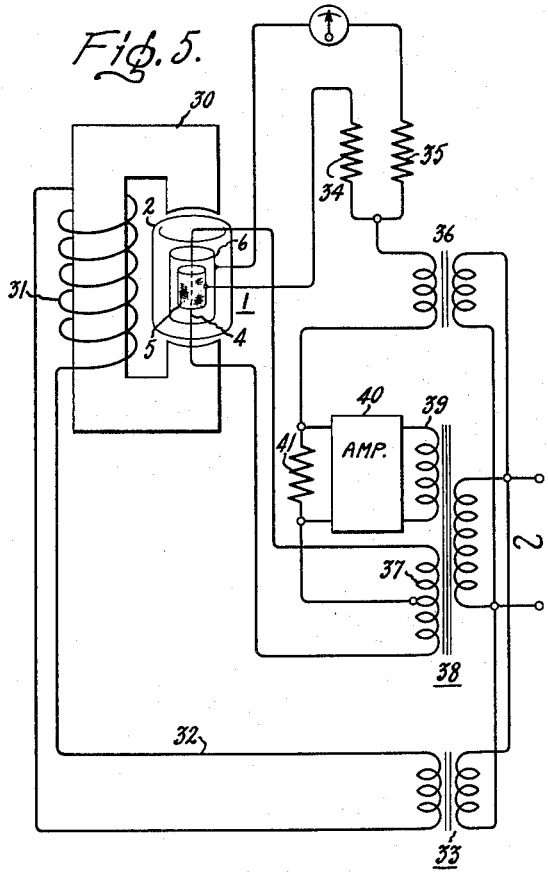
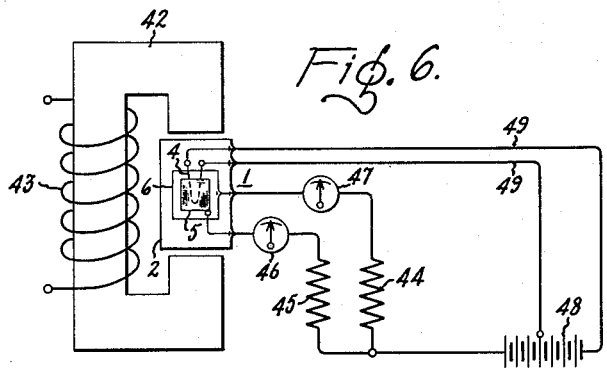
Inventor:
Howard B. Baughman,
by *Merton D. Moore*
His Attorney.

Inventor:
Howard B. Baughman,
by Merton D Morse
His Attorney.

_United States Patent Office_

2,961,601
Patented Nov. 22, 1960

2,961,601

MEAN FREE PATH VACUUM GAGE

Howard B. Baughman, Louisville, Ky., assignor to General Electric Company, a corporation of New York Filed Dec. 27, 1957, Ser. No. 705,557

6 Claims. (Cl. 324—33)

This invention relates to a method and apparatus for measuring pressure and, more particularly, for measuring very low gas pressures.

One of the principal objects of this invention is to provide a pressure measuring vacuum gage utilizing an electron rather than ion current as the measuring parameter. As is well understood in the art to which this invention pertains, one of the customary methods for measuring very low gas pressures contemplates providing an ion producing electron stream and a negatively charged collector electrode arranged to collect the positively charged ions produced by collision of electrons and neutral gas molecules, with the total number of ions produced and collected affording a measure of the gas pressure. Systems of this type while satisfactory for many purposes do suffer from limitations which circumscribe its utility. Thus, for example, the upper limit of such ion vacuum gages is approximately $10^{-3}$ millimeters (or 1 micron) and they are thus incapable of measuring pressures ranging from approximately $10^{-3}$ millimeters to 10 millimeters (1 to 10,000 microns).

Furthermore, ionization gages require operating potentials of fairly high values since the electrons must have sufficiently high velocities to effect impact ionization, for to achieve the highest order of accuracy and sensitivity, it is necessary to produce as large a degree of ionization as possible.

In addition, the accuracy of such ion vacuum gages is very strongly dependent upon maintaining a predetermined and steady electron current since the ion current varies therewith. As a consequence, elaborate voltage control equipment is necessary to control the ion producing electron current through and the temperature of the electron emitting cathode which supplies them.

Hence, another object of this invention is to provide a vacuum gage which is not sensitive to variations in the emission current.

A further object of this invention is to provide a method and apparatus for measuring low pressures which utilizes electron current as the indicating parameter.

Still another object of this invention is to provide a vacuum gage wherein the ratio of electron currents from two collecting electrodes is utilized as an indicating parameter.

Yet another object is to provide a vacuum gage wherein the mean free path of the electron stream is utilized as a measure of the gaseous pressure.

A still further object of this invention is to provide a mean free path vacuum gage wherein a magnetic field is utilized to increase the path length.

Other objects and advantages will become apparent as the description of the invention proceeds.

The above objects are achieved by providing electron emitting and collecting electrodes within the gage. The emitted electrons have velocities insufficient to cause ionization of gas molecules with which they may collide. The electrons are accelerated and captured by a pair of positively charged collecting electrodes. At low pressures the emitted electrons divide between the electrodes in a given ratio. As the pressure increases the mean free path decreases and collisions between the electrons and gas molecules increase, causing the electrons to remain for a greater length of time where one of the electrodes is the dominant factor and, hence, are captured by that electrode. Consequently, the electron current in one of the electrodes increases and that in the remaining electrode decreases. This change in electron current may then be calibrated in terms of pressure.

An additional ramification of the mean free path approach is that a very simple yet effective correction for variations in the emissivity of the cathode may be achieved by utilizing the ratio of currents from the two collecting electrodes as the indication. Thus, if the total emission current changes, due to some transient or permanent condition other than a pressure change, the ratio of the two collected currents will not change even though the absolute magnitudes may. Hence, an extremely simple and accurate compensation for such emission variations is achieved.

Furthermore, both unidirectional and alternating voltages may be used with equal success as the energizing sources.

In another refinement of the basic concepts, a magnetic field is utilized whereby the electrons move in a spiral path increasing the path length and the collision probabilities.

The novel features which are believed to be characteristic of this invention are set forth with particularity in the appended claims. The invention itself, however, both as to its organization and method of operation together with further objects and advantages thereof may best be understood by reference to the following description taken in connection with the accompanying drawings in which:

Figure 1 illustrates one embodiment of the mean free path vacuum gage embodying the principles of the instant invention;

Figure 2 illustrates schematically an alternative construction of a vacuum gage of the type shown in Figure 1;

Figure 3 shows an alternative embodiment of the gage of Figure 1 utilized with a ratio measuring device;

Figure 4 illustrates a gage wherein an alternating current energizing source is utilized;

Figures 5 and 6 illustrate other alternative embodiments wherein a magnetic field is utilized in conjunction with the vacuum gage to produce an increased path length.

Figure 7:
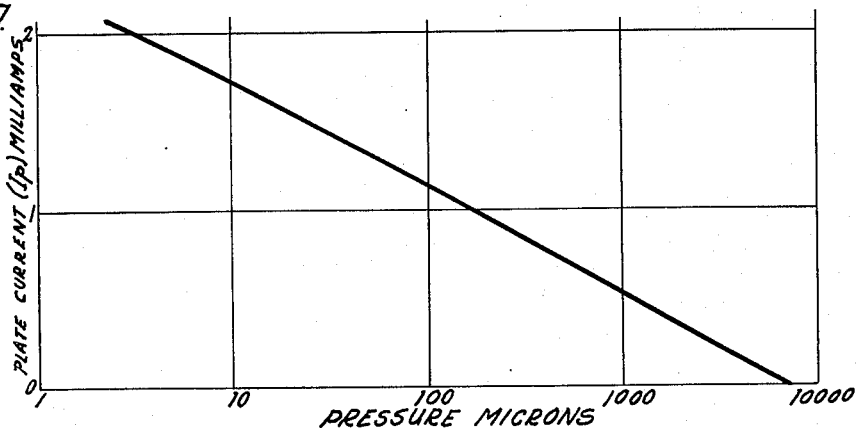
Figures 7–9 illustrate graphically the relationship between pressure and various operating parameters such as collector current, collector series resistances, operating potentials, etc.

Referring now to Figure 1 the novel mean free path vacuum gage, illustrated generally at 1, has an envelope 2 which communicates through a tube to the vacuum system 3, the gas pressure of which is to be measured. Within the envelope 2 is an axially extending electron-emitting cathode element 4 which may be of the directly heated type, as shown, or of the indirectly heated type. A perforated cylindrical collecting electrode or grid 5 is coaxial with and adjacent to the cathode 4. A second imperforate cylindrical collecting electrode, or anode 6, coaxial with and surrounding the cathode 4 and the control grid 5, is also mounted within the envelope 2 of the gage 1. The several electrodes, although represented in the drawing as cylindrical may, of course, be of the planar type without departing from the spirit of the instant invention.

The directly heated cathode 4 is energized from a source of alternating potential, which may conveniently be applied thereto through a transformer 7, the secondary of which is connected to the cathode and the primary of which is connected to any suitable source of alternating current voltage. It is obvious, of course, that unidirectional voltage may be utilized in place of the alternating source without departing from the basic inventive principles.

The collecting electrodes 5 and 6 are each maintained at a potential which is slightly positive with respect to the cathode 4 by means of a source of unidirectional energizing potential such as the battery 12, or the like, the positive terminal of which is connected through resistances 11a, 11b, or 15a, 15b, dependent on the position of switches 9 and 9a to the respective electrodes by suitable leads 8 and 14. The positive potential thus applied to the collecting electrodes 5 and 6 is sufficient to accelerate and collect the electron emitted by the cathode while yet not sufficiently high to produce ionization of the gaseous medium. A number of measuring instruments such as microammeters 10, 10a, and 13 are connected to the collecting electrodes 5 and 6 and the cathode 4 to provide a measure of the electron currents flowing in the output circuits of these elements, which electron current flow is a measure of the gas pressure within the envelope 2.

The sensitivity of the mean free vacuum gage in various pressure ranges may be manipulated, as will be described in detail later with reference to the graphs of Figures 7-9, by adjusting various of the operating parameters such as collecting electrode voltages, total current, collector series resistance, etc. In order to control the magnitude of the series connected collector resistances, the various resistances; i.e., 11a, 11b, 15a, 15b, etc., are made selectively available by means of the switches 9 and 9a connected to the collector leads 8 and 14. In this fashion the operating conditions of the vacuum gage may be varied to take full advantage of the sensitivities over varying ranges of pressure.

An alternative embodiment of the mean free path vacuum gage of Figure 1, illustrated in Figure 2 with corresponding elements designated by the same numerals, uses the voltage drop produced by the electron current from one of the collecting electrodes rather than the current itself as the measuring index. A vacuum gage, illustrated schematically, of the type shown in Figure 1, consisting of the envelope 2 having the electron emitting cathode 4 and the collecting electrodes 5 and 6 positioned therein, has the collecting electrodes connected through a pair of series resistances 16 and 17, respectively, to the positive terminal of a source of unidirectional operating potential 12, such as a battery or the like, the negative terminal of which is connected to the electron emitting cathode 4.

Connected across the resistance 17 through which the electron current from the electrode 6 flows is a direct current amplifier means illustrated in block diagram form having an indicating instrument 19, such as a direct current voltmeter connected across the output. The direct current amplifier 18 illustrated in block diagram form may be any one of many such well known devices, and particularly may be of the type illustrated on pages 111-117 of Electron Tube Circuits, Sealy, McGraw-Hill Book Company, Inc. (New York), 1950.

In operation the mean free path vacuum gage illustrated in Figures 1 and 2 is characterized by a change in distribution of the electron current between the two collecting electrodes as a function of gas pressure. The two collecting electrodes 5 and 6 are maintained at a slightly positive potential in order to accelerate and attract the electrons emitted from the cathode element 4. At the very low pressure end of the gage operating range the potentials on the collecting electrodes and the geometry of the perforated collecting electrode 5 or grid element, are so arranged that most of the electrons miss the perforated grid element 5 passing therethrough to be collected at the more distant or second collecting electrode 6.

When the gas pressure within the envelope 1 increases the electrons emitted from the cathode 4 are subject to an increasing number of collisions before reaching the collecting elements. The collisions between the electrons and the gas molecules retain the electrons for a greater period of time in the vicinity of the perforated collecting electrode 5. The slightly positive voltage on electrode 5 draws the electrons to the electrode where they are collected causing a current to flow. Thus, the electron current distribution between the perforated collecting electrode 5 and the solid collecting electrode 6 is changed, with the electron current in the electrode 5 increasing and that in the element 6 decreasing. At very high pressures; i.e., several millimeters of mercury (in the vicinity of 10,000 microns), the electrons will make several thousand such collisions, and as a result practically all electrons are collected by the closer perforated electrode 5.

This relationship between electron current $I_p$ flowing from electrode 6 and gas pressure is illustrated very clearly in the curve of Figure 7 wherein the current $I_p$ flowing in the output circuit of the collector element 6 decreases logarithmically as the pressure increases from approximately 1 to 10,000 microns ($10^{-3}$ mm. to $10^1$ mm.) until in the vicinity of 10,000 microns it is almost negligible. Thus, it can be seen that an indicating and measuring instrument such as a microammeter connected in the output circuit of the collecting electrode 6 may be calibrated directly in gas pressures.

The most direct method of indication, and that discussed with reference to Figures 1 and 2, is to monitor the electron current from one of the electrodes. There may, however, in certain instances, be disadvantages in this approach since any variation in the cathode temperature and hence the emission current results in an apparent pressure change. To by-pass this difficulty it is, of course, possible to control the emission current from the cathode. However, a much simpler and less complex way is illustrated in Figure 3. In the device of Figure 3 the mean free path vacuum gage 1, comprising an evacuated envelope 2, an electron emitting cathode 4 and a pair of collecting electrodes 5 and 6, is connected to provide a measure of the ratio of the currents from the two collecting electrodes as an indication of the gas pressure. Consequently, the collecting electrodes 5 and 6 are connected to a ratio measuring device 20, illustrated in block diagram form, which produces an output proportional to the ratio of the electron currents from electrode 5 ($I_g$) and electrode 6 ($I_p$), or $$\left(\frac{I_g}{I_p}\right)$$

The ratio meter illustrated in block diagram form at 20 may be any one of the many well known instrumentalities for performing this function. For example, a circuit utilizing a pair of logarithmic diodes to produce the division may be utilized. A circuit of this type which may be utilized is illustrated at Figure 5.36, page 125 of Electronic Instruments, Radiation Laboratory Series, vol. 21, Greenwood, Holdam, and MacRae, McGraw-Hill Book Company, Inc. (1948), New York.

It can be easily seen that utilizing the ratio of currents from the two collecting electrodes minimizes the problem of emission variation since the sum of the collector electrode currents is equal to the total emission current while the distribution of the electron currents between the electrodes is a function of gas pressure and independent of the absolute magnitude. Consequently, the ratio between these currents at any given pressure remains constant no matter what the total emission current. Hence, the simple circuit of Figure 3 provides an instrument of enhanced accuracy by measuring the ratio of the currents flowing in the external circuit of the respective collecting electrodes.

It has been found that the mean free path vacuum gage, described above, is extremely flexible since the sensitivity and the range of sensitivity of the instrument may be varied and controlled by manipulating various of the operating parameters. Thus, for example, by varying parameters such as the collecting electrode series resistance, the collecting electrode voltages, and the total current or filament temperatures, the sensitivity can be distributed over a wide range of pressures or it can be concentrated in a very narrow range to produce a high sensitivity, limited-range gage. Figures 8 and 9 illustrate graphically such sensitivity variations for various operating parameters.

Figure 8:
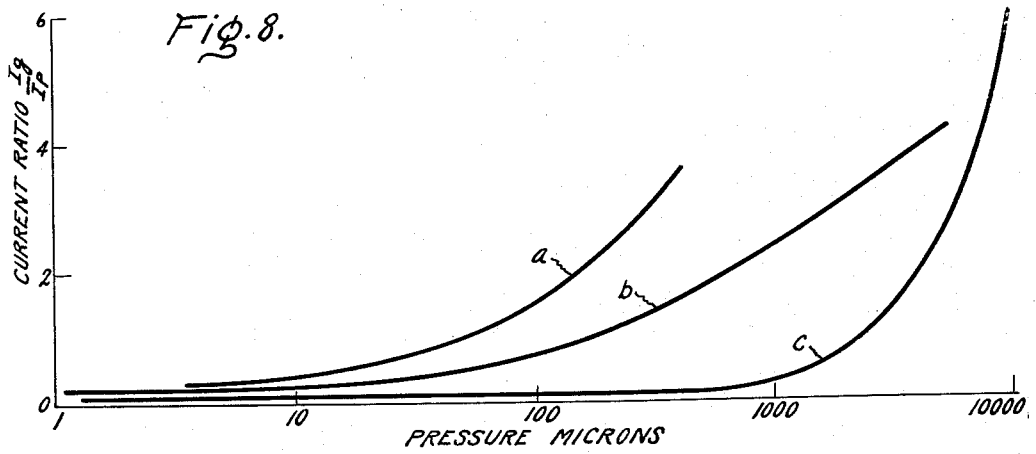

Figure 8, wherein pressure in microns is plotted along the abscissa and current ratio $$\left(\frac{I_5}{I_6}\right)$$

along the ordinate, discloses three curves, $a$, $b$, and $c$, representing different operating parameters with curve $a$ illustrating the condition where the electrode 6 series resistance $R_6$ is very large compared to that of electrode 5 ($R_5$) with the following values being utilized:

$R_5 = 100$ ohms
$R_6 = 5000$ ohms
$B^+ = 37$ volts

It can be seen that an instrument having a sensitivity range extending from approximately 10 microns to 700 microns is provided by virtue of the relationship $R_6 \gg R_5$.

Curve $b$, on the other hand, illustrates that varying the collecting electrode voltages while maintaining the resistances in series therewith constant produces an extended operating range extending from 10–7,000 microns. The operating parameters producing the relationships of curve $b$ were:

$R_5 = 100$ ohms
$R_6 = 5000$ ohms
$B^+ = 22$ volts

Thus, by maintaining the series resistances constant and varying the battery voltage a much wider operating range is obtained than that shown by the curve $a$.

By holding the battery and collecting voltages constant and then varying the relative magnitudes of the series resistances for the individual electrodes, it is possible to achieve very high sensitivities in a limited range as illustrated by the curve $c$.

By making the resistance $R_5$ in series with the perforated electrode 5 larger, by a factor of 2 to 1, than $R_6$ in series with the remaining collecting electrode 6, a very high sensitivity limited-range gage may be achieved as illustrated in curve $c$. Thus, with the following values:

$B^+ = 37$ volts
$R_5 = 4600$ ohms
$R_6 = 2200$ ohms the high sensitivity limited-range gage of curve $c$ is achieved, whereas the relationship $R_6 \gg R_5$ produces a wide range gage, illustrated by curve $a$. Thus, the curves of Figure 8 point out quite clearly that the various operating parameters of the mean free path gage may be manipulated to produce many diverse and desirable operating characteristics.

Figure 9:
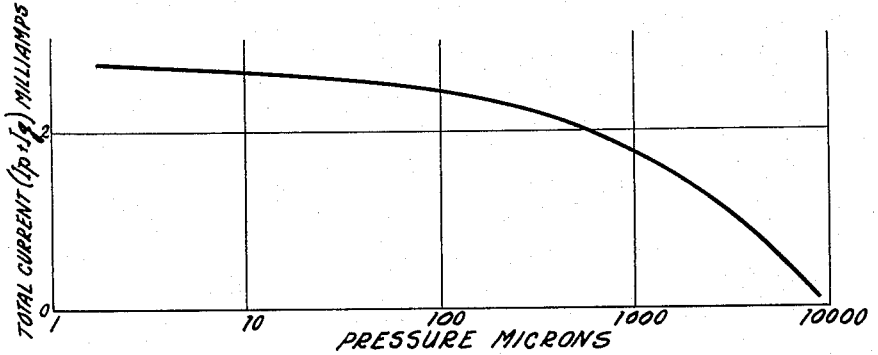

Figure 9 illustrates that the total emission current; i.e., the sum of the current from the individual collecting electrodes, is another variable sensitive to pressure variations. As can be seen from the curve, the total current in milliamperes remains fairly constant from 1 to 100 microns of pressure and drops off very rapidly from 100 to 10,000 microns.

In discussing the mean free path gage illustrated in Figures 1, 2 and 3, as well as the operation thereof, unidirectional operating voltages have been utilized and presupposed. However, the instant invention is not limited thereto but may equally be carried out with alternating potential sources in place of unidirectional ones. Figure 4 illustrates such a gage which also contains an emission current regulating circuit. An envelope 2, having an electron emitting cathode 4, and a pair of collecting electrodes 5 and 6, positioned within the envelope, constitute the mean free path vacuum gage 1. The collecting electrodes 5 and 6 are connected through resistors 21 and 22, respectively, to the secondary winding of a transformer 23 constituting a source of operating potential, the primary of which is connected to an alternating voltage source. One end of the secondary winding is connected to the junction of the resistances 21 and 22 and the other end through a voltage dropping resistor 29 to the center point of secondary winding 26 of transformer 24. The filament transformer 24 comprises a primary connected to a suitable source of alternating voltage and a pair of secondary windings 26 and 27, the latter being connected across an amplifier 28 and the resistance 29 and acting as a control winding to regulate the magnitude of the filament voltage applied to the filament 4, and the former connected directly to the cathode element 4 to supply energization therefor.

The resistor 29 acts as a voltage dropping resistor to produce a voltage proportional to the amount of filament current, which voltage is applied to the amplifying means 28 to control the control winding 27 of the saturable transformer 24.

In operation, since the transient time of the electrons from the cathode 4 to the collecting electrodes 5 and 6 is small as compared to 60 cycles, any given electron will see approximately a unidirectional field during the positive half-cycle of the voltage applied to the secondary of the transformer 23. Consequently, during the positive half-cycle of the voltage the electrons are emitted and collected by the respective collecting electrodes depending upon the gas pressure therein. During the negative half-cycle of the operating voltage from the transformer 23, the field within the electron gage 1 is negative and the tube will be cut-off forming a space charge around the emitting electrode. When the electric field then goes back to positive, during the next positive half-cycle of the operating voltage, this space charge is carried to the two collecting electrodes. Hence, the tube acts as a rectifier and the collected currents are half-wave rectified signals which can be averaged out in a measuring instrument such as the meter 25 connected in series with the collecting electrode 6 to produce a unidirectional signal. Thus, gage 1 acts as a combination rectifier-vacuum gage permitting the utilization of an alternating operating potential.

The cathode or filament regulating circuit comprising the voltage dropping resistance 29, amplifier 28, and control winding 27 operates in the following manner: as long as the total emission current remains constant the voltage drop across the resistor 29, which is traversed by the total filament current, remains constant as does the output of the amplifying element 28 and, hence, the current flow through the coil 27. Should the emission change the voltage drop across the resistor 29 changes, varying the current in the control coil 27 loading the primary 25 of the transformer 24, varying the voltage across the secondary coil 26. In this manner any variations of the total emission current produce an output signal across the resistor 29 which controls the current flow through the winding 27 and, in turn, the magnitude of the filament or heating voltage at winding 26.

In the mean free path vacuum gage construction illustrated in Figures 1–4, the sensitivity around 2 or 3 microns of pressure may be low due to the fact that insufficient collisions are made by the electrons to cause a significant change in electron current distribution between the two electrodes. In order to achieve enhanced sensitivity at these low pressures there has been added to the vacuum gage previously described an axially extending magnetic field which causes the electrons to move in a spiral path thus increasing the probabilities of a collision with the gas molecules. Figure 5 illustrates a vacuum gage of such construction. The gage 1 consisting of electron emitting cathode 4, perforated collecting electrode 5, and a second collecting electrode 6, within an envelope 2, is positioned in the air gap of a generally U-shaped magnetic core member 30 having a coil 31 wound in flux exchange relationship therewith to produce an axially extending magnetic field. The coil 31 is connected by means of a pair of suitable leads 32 to the secondary of a transformer 33, the primary of which is connected to a suitable source of alternating voltage.

The vacuum gage 1 is of the type having an alternating operating voltage as well as a regulated source of filament voltage for the cathode element 4. In a manner similar to that described with reference to Figure 2, the collecting electrodes 5 and 6 are connected through a pair of series resistance elements 34 and 35, respectively, to the secondary of a transformer 36, the primary of which is connected through the same source of alternating potential as the magnetic field voltage supply transformer 33. The cathode 4 is connected to a suitable source of filament voltage through a secondary winding 37 of a transformer 38, the primary of which is connected to the same source of alternating voltage as are the the primaries of transformers 33 and 36.

A regulating circuit such as that described with reference to Figure 4 is provided to control the filament voltage magnitude and includes a voltage dropping resistance 41 connected in series with the secondary of transformer 36 and the center tap on the coil 37. The voltage drop across the resistor 41 through the action of amplifier 40 controls the current flow through a control winding 39 which regulates the voltage applied to the filament in the event of emission current changes. The manner of operation of the regulating circuit of Figure 5 has been described previously with reference to Figure 4 and will not be repeated here. Suffice it to say that the emission current is maintained constant by virtue of the action of the regulator.

In operation a spiral electron path is produced by virtue of the axially extending magnetic field acting at right angles to the normal trajectory of the electron. That is, the electrons emitted from cathode 4 normally move in a radial direction from the cathode towards the cylindrical current collecting electrodes 5 and 6. The presence of the magnetic field at right angles to this direction of motion produces, as is well known, a spiral electron orbit which, as has been pointed out above, enhances the probability of collisions with gas molecules, thus improving sensitivity at the lower end of the pressure range.

It should be understood, however, that a direct current magnetic or a permanent magnet may be utilized with equal success.

Figure 6 illustrates an alternative embodiment of a mean free path vacuum gage including a magnetic field and a unidirectional potential source. The envelope 2 of the gage contains an electron emitting cathode element 4 and a pair of collecting electrodes 5 and 6 and is positioned in the air gap of a U-shaped core member 42 having a coil 43 mounted in flux exchange relationship therewith to produce an axially extending magnetic field which induces a spiral motion in the electrons emitted from the cathode 4. The coil 43 mounted on the core element 42 may be connected to any suitable unidirectional source to provide a constant axially extending magnetic field. The electron collecting electrodes 5 and 6 are connected to the positive terminal of a unidirectional source of operating potential 48, such as a battery or the like, through a pair of series resistors 44 and 45 and a pair of current measuring instruments 46 and 47 such as microammeters or the like. The cathode element 4 is connected by a pair of suitable leads 49 across a portion of the battery 48 to provide suitable energization. The apparatus of Figure 6 operates precisely in the manner described with reference to Figure 5, the only difference being in the type of power supply provided.

It can be seen from the previous discussion that a pressure measuring instrument has been provided which is simple, accurate, and extremely flexible in providing desired operating characteristics which yet does not rely on the ionization of the gaseous medium as the means for providing a measure of the gas pressure.

While particular embodiments of this invention have been shown it will, of course, be understood that the invention is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. The combination, in a device for measuring low gas pressures, of an evacuated vessel having within it an electron emitter and two electron collecting electrodes spaced therefrom, the interior of said vessel adapted to be subjected to the gas pressure to be measured, and said electrodes being so located that at least a portion of the electrons from said emitter pass through the first collecting electrode toward the second collecting electrode, means to maintain both said electron collecting electrodes positive with respect to said emitter by a small amount to attract electrons but insufficient to produce measurable ionization of said gas whereby as the gas pressure increases the number of electrons received by the first collecting electrode increases and the number received by the second collecting electrode decreases due to collisions of electrons with gas molecules as they traverse the space to said electrodes, and means to provide a magnetic field within said vessel to produce a spiral electron path whereby the collision probability is increased.

2. The combination, in a device for measuring low gas pressures, of an evacuated vessel having within it an electron emitter and two electron collecting electrodes spaced therefrom, the interior of said vessel adapted to be subjected to the gas pressure to be measured, and said electrodes being so located that at least a portion of the electrons from said emitter pass through the first collecting electrode toward the second collecting electrode, means to maintain both said electron collecting electrodes positive with respect to said emitter by a small amount to attract electrons but insufficient to produce measurable ionization of said gas whereby as the gas pressure increases the number of electrons received by the first collecting electrode increases and the number received by the second collecting electrode decreases due to collisions of electrons with gas molecules as they traverse the space to said electrodes, and means to provide a magnetic field substantially perpendicular to the normal electron trajectory to produce a spiral electron path whereby the collision probability is increased.

3. The combination, in a device for measuring low gas pressures, of an evacuated vessel having within it an electron emitter and two electron collecting electrodes spaced therefrom, the interior of said vessel adapted to be subjected to the gas pressure to be measured, and said electrodes being so located that at least a portion of the electrons from said emitter pass through the first collecting electrode toward the second collecting electrode, means to maintain both said electron collecting electrodes positive with respect to said emitter by a small amount to attract electrons but insufficient to produce measurable ionization of said gas whereby as the gas pressure increases the number of electrons received by the first collecting electrode increases and the number received by the second collecting electrode decreases due to collisions of electrons with gas molecules as they traverse the space to said electrodes, means to provide a magnetic field substantially perpendicular to the normal electron trajectory to produce a spiral electron path whereby the collision probability is increased, and indicating means responsive to the current in one of said electron collecting electrodes.

4. In a non-ionizing gas pressure measuring device, the combination comprising an envelope exposed to the gas pressure to be measured, means positioned within said envelope for collecting an electron current directly in response to said gas pressure, said last named means including an electron beam generating means and a plurality of electron collecting electrodes, means to maintain said plurality of electron collecting electrodes positive with respect to said generating means by such an amount that substantially no ionization takes place and the quantity of electrons collected by the individual ones of the plurality of electrodes is directly related to the gas pressure, and indicating means responsive to the electron collecting electrodes.

5. In combination, in an non-ionizing gas pressure measuring device, an envelope interior of which communicates with the source of gas pressure to be measured, mean-free electron path pressure measuring means within said envelope for collecting an electron current directly in response to the gas pressure within said envelope, said means including an electron emitting electrode and two electron collecting electrodes spaced therefrom, said collecting electrodes being so located that at least a portion of the electrons from said emitter pass through one of said collecting electrode towards the other collecting electrode, means to maintain both said electron collecting electrodes positive with respect to said emitter electrode by such an amount that electrons are attracted thereby but substantially no ionization of the gas takes place so that the ratio of electron currents collected at the respective collecting electrodes varies with gas pressure in said envelope.

6. In combination, in a non-ionizing gas pressure measuring device, an envelope communicating with a source of gas pressures to be measured, an electron emitting electrode and two electron collecting electrodes positioned within said envelope, said electron collecting electrodes being maintained at a positive potential with respect to said emitting electrode, said potential being of such a magnitude that substantially no ionization of the gas takes place and the electron current collected by the respective electrodes is directly proportional to the gas pressure within said envelope, and means to measure the ratio of the electron currents collected at said electrodes as an indication of the gas pressure.

References Cited in the file of this patent

UNITED STATES PATENTS

| | | |
|---|---|---|
| 2,648,818 | Cohen | Aug. 11, 1953 |
| 2,829,337 | Groendijk | Apr. 1, 1958 |